(12) United States Patent
Richardson et al.

(10) Patent No.: US 7,687,756 B2
(45) Date of Patent: Mar. 30, 2010

(54) IMAGE SENSOR POWER DISTRIBUTION

(75) Inventors: Justin Richardson, Edinburgh (GB); Donald Baxter, Lothian (GB)

(73) Assignee: STMicroelectronics (Research & Development) Limited, Marlow, Buckinghamshire (GB)

( * ) Notice: Subject to any disclaimer, the term of this patent is extended or adjusted under 35 U.S.C. 154(b) by 16 days.

(21) Appl. No.: 12/103,376

(22) Filed: Apr. 15, 2008

(65) Prior Publication Data

US 2008/0251696 A1 Oct. 16, 2008

(30) Foreign Application Priority Data

Apr. 16, 2007 (EP) .................................. 07106267

(51) Int. Cl.
*H01L 27/00* (2006.01)
*H01L 23/48* (2006.01)
*H04N 5/225* (2006.01)

(52) U.S. Cl. ................. 250/208.1; 250/214.1; 257/735; 257/784; 348/372; 348/374

(58) Field of Classification Search ............... 250/208.1, 250/214 R, 214.1; 348/304, 308.1, 372, 348/374; 358/482, 483; 257/207, 343, 459, 257/735–739, 778–784
See application file for complete search history.

(56) References Cited

U.S. PATENT DOCUMENTS

| 5,663,555 | A | * | 9/1997 | Miyawaki et al. | ......... 250/208.1 |
| 6,163,386 | A | * | 12/2000 | Kobayashi et al. | .......... 358/482 |
| 2005/0224841 | A1 | | 10/2005 | Nakamura et al. | .......... 257/215 |
| 2006/0180742 | A1 | | 8/2006 | Kwon | ....................... 250/208.1 |

\* cited by examiner

*Primary Examiner*—Georgia Y Epps
*Assistant Examiner*—Don Williams
(74) *Attorney, Agent, or Firm*—Lisa K. Jorgenson; Allen, Dyer, Doppelt, Milbrath & Gilchrist, P.A.

(57) ABSTRACT

An image sensor power distribution arrangement includes a sensing portion having a first contact at a first edge thereof and a second contact at a second edge thereof, and a control portion. A first power supply supplies power to the sensing portion via the first contact. A second power supply supplies power to the sensing portion via the second contact, and to the control portion.

27 Claims, 3 Drawing Sheets

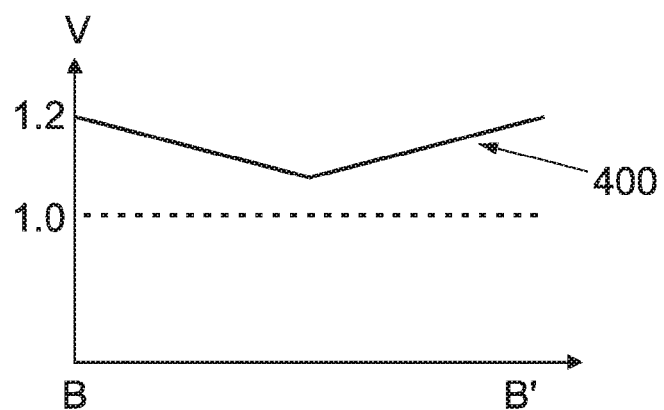
Fig. 4
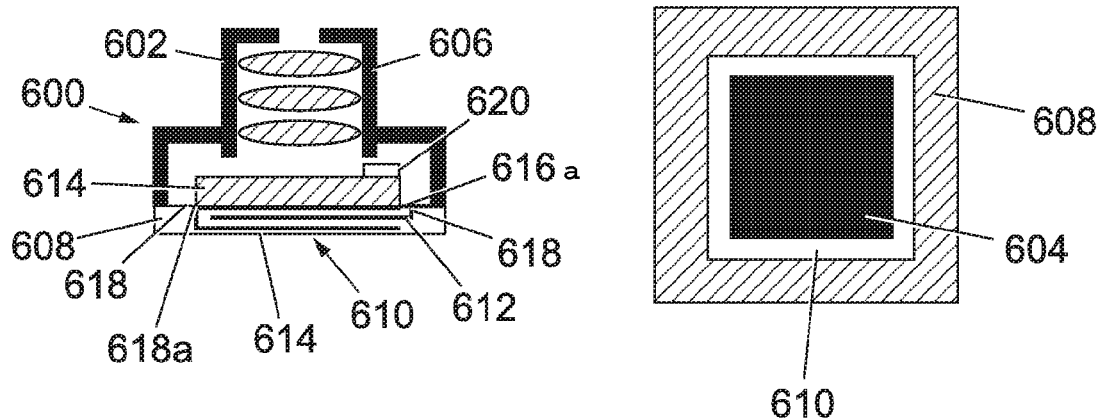
Fig. 6
Fig. 7

IMAGE SENSOR POWER DISTRIBUTION

FIELD OF THE INVENTION

The present invention relates to image sensor power distribution, and more particularly, but not exclusively, to a method and arrangement of image sensor power distribution. Even more particularly, but not exclusively, the present invention relates to a method and arrangement of image sensor power distribution of a standard mobile imaging architecture (SMIA) compatible image sensor.

BACKGROUND OF THE INVENTION

Referring now to FIG. 1, a prior art image sensor 100 comprises a regulated power supply 102, a sensing portion 104 and a control portion 106. The sensing portion 104 comprises a digital logic array 108 and an image sensor array 110. The image sensor array 110 comprises a pixel array 118 and first and second analog-to-digital converters 120, 122. The control portion 106 comprises a clock 112, an input-output (IO) port 114, which together forms a serial macro element 115 and a phase locked loop (PLL) 116.

Typically, a SMIA compatible image sensor requires a supply voltage of 1.2±0.2V to be compliant with the industry standard camera serial interface (CSI-2) specification. The voltage drop δV across the sensing portion 104 is determined by the relationship:

$$\delta V = IR$$

where R is the resistance of the digital element, and I is the current passing through the digital element.

The voltage drop across the sensing portion 104 is typically linear. The voltage drop may be sufficient to compromise the compatibility of the output of the image sensor 100 with the SMIA. That is, the voltage drop may be more that 100 mV.

Additionally, the connection of the power supply 102 remote from the control portion 106 via semiconductor substrate upon which the image sensor 100 is fabricated gives rise to high impedance between an external capacitor 124 and the control portion 106. A high impedance results in poor decoupling of current spikes between the power supply 102 and the control portion 106. Current spikes can cause cross-talk and jitter in the output signal.

A greater capacitance of the external capacitor 124 provides enhanced decoupling of current spikes. However, the provision of on-chip capacitance in excess of 100 nF, for example, is not practical due to the impedance of the semiconducting nature of the substrate upon which the image sensor 100 is fabricated.

SUMMARY OF THE INVENTION

According to an aspect of the present invention, an image sensor power distribution arrangement comprises a first power supply, a control portion and a sensing portion. The first power supply may be arranged to supply power to the sensing portion via a first contact at a first edge of the sensing portion.

A second power supply may also be arranged to supply power to the control portion, and may be further arranged to supply power to the sensing portion via a second contact at a second edge of the sensing portion. Such an arrangement may result in an IR drop across the sensing portion being reduced since the sensing portion is driven from two points.

The first power supply may be located remote from the control portion, and the second power supply may be located adjacent the control portion. The first and second power supplies may be located in respective first and second pad rings of the image sensor. The first and second pad rings may be opposed to each other across the sensing element.

Since each power supply may be required to supply only half of the current and across half of the resistance, the voltage drop associated with each power supply may be one quarter of that of a single power supply architecture.

The first power supply may connect to the sensing element at multiple points. The second power supply may connect to the sensing element at multiple points opposed to those points at which the first power supply connects to the sensing element. Either or both of the first and second power supplies may be regulated power supplies.

The outputs of the first and second power supplies may be connected via a track on a substrate bearing the image sensor. The track may have an impedance less 1Ω, and preferably less than 0.1Ω.

This architecture advantageously improves load regulation performance by reducing the IR drop across the parasitic impedance due to the track. The architecture may comprise a decoupling capacitor located adjacent the second power supply. Alternatively, the decoupling capacitor may comprise a capacitor external the image sensor. The capacitor may have a capacitance greater than 100 nF, for example.

The location of the decoupling capacitor adjacent to the second power supply may reduce impedance associated with interconnects between the capacitor and the image sensor. The capacitor external the image sensor may be provided by the substrate of the image sensor, which is typically a printed circuit board (PCB).

BRIEF DESCRIPTION OF THE DRAWINGS

The invention will now be described, by way of example only, with reference to the accompanying drawings, in which:

FIG. 4 is a graph showing an example voltage drop across the image sensor power distribution arrangement of FIG. 3 along the line B-B';

FIG. 6 is a schematic diagram of an image sensor comprising a capacitor according to the present invention for use in the power distribution arrangements of FIGS. 3 and 5; and FIG. 7 is a plan view of elements of the capacitor of FIG. 6.

DETAILED DESCRIPTION OF THE PREFERRED EMBODIMENTS

Figure 1:
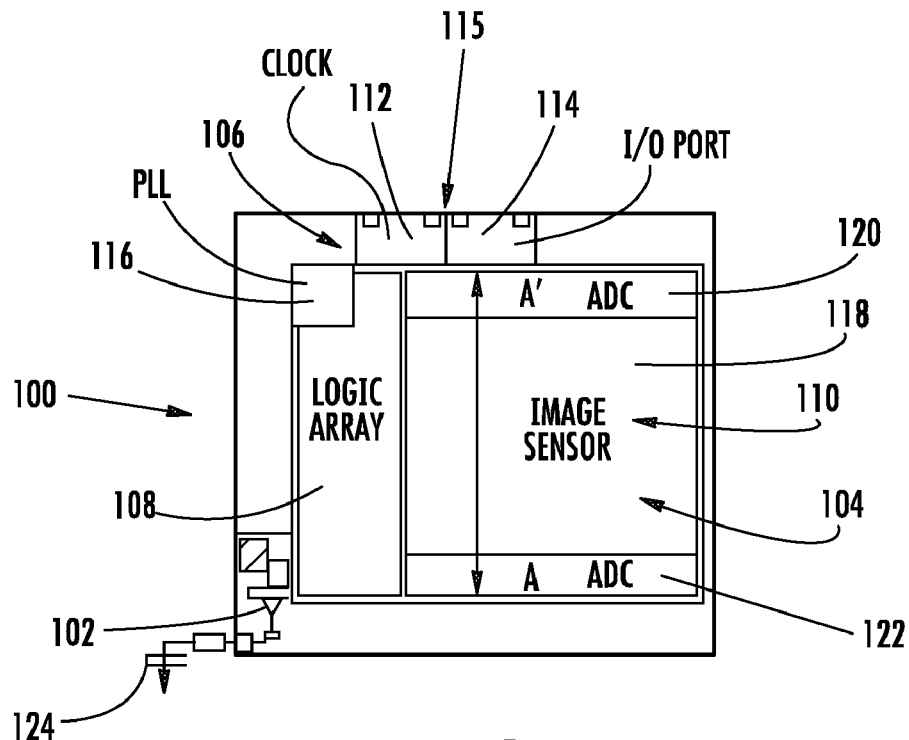
FIG. 1 is a schematic diagram of an image sensor power distribution arrangement according to the prior art.
Figure 2:
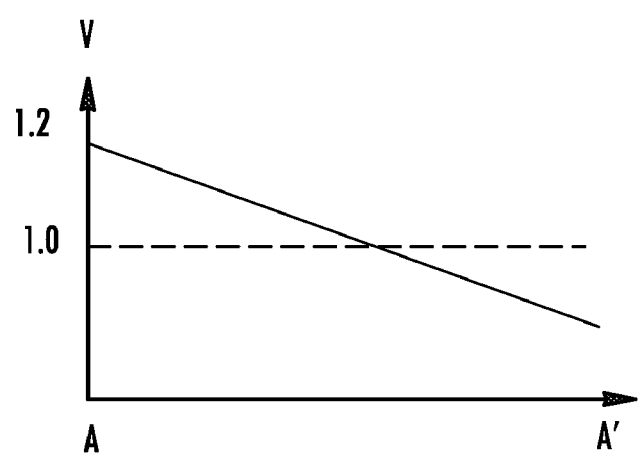
FIG. 2 is a graph showing an example voltage drop across the image sensor power distribution arrangement of FIG. 1 along the line A-A'.
Figure 3:
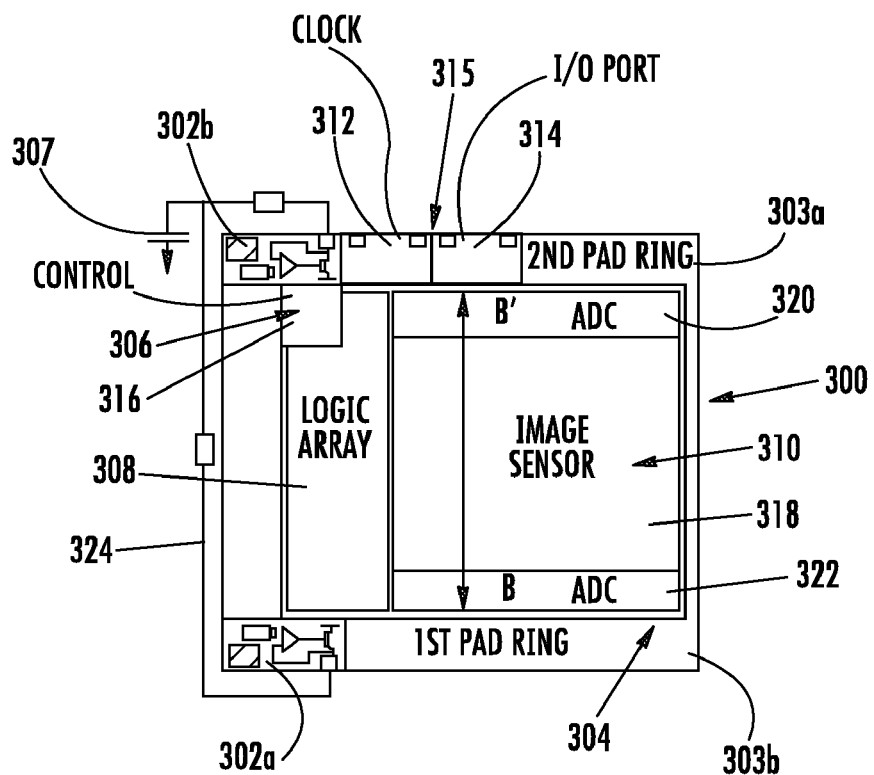
FIG. 3 is a schematic diagram of a first embodiment of an image sensor power distribution arrangement according to the present invention.

Referring now to FIGS. 3 and 4, an image sensor 300 comprises regulated power supplies 302a, 302b, upper and lower ring pads 303a, 303b, a sensing portion 304 and a control portion 306. Typically, the power supplies 302a, 302b are regulated voltage supplies. Usually, the power supplies 302a, 302b have an output of 1.2V.

A decoupling capacitor 307 is formed external the image sensor 300 and decouples the power supplies 302a, 302b from external signals. Typically, the capacitor 307 has a capacitance in excess of 100 nF. The construction of the decoupling capacitor 307 is described in detail below.

The sensing portion 304 comprises a digital logic array 308 and an image sensor array 310. The image sensor array 310 comprises a pixel array 318, and first and second analog-to-digital converters (ADCs) 320, 322. The control portion 306 comprises a clock 312 and an input-output (IO) port 314, which together forms a serial macro element 315, and a phase locked loop (PLL) 316.

One of the power supplies 302a is located in the upper ring pad 303a. The power supply 302a is adjacent both the control portion 306, and a corner of the sensing portion 304 next to one of the ADCs 320. This power supply 302a supplies power to both the sensing portion 304 and the control portion 306. The electrical connection between the power supply 302a and the sensing portion 304 is provided by a single contact to the ADC 320, adjacent the control portion 306.

The other power supply 302b is located in the lower ring pad 303b. This power supply 302b is adjacent the other corner of the same side of the sensing portion 304, next to the other of the ADCs 322. This power supply 302b supplies power to the sensing portion 304. The electrical connection between the power supply 302b and the sensing portion 304 is provided by a single contact to the ADC 322.

The outputs of the power supplies 302a,b are linked via a track 324 formed on a substrate which the image sensor 300 is mounted on. Typically, the track 324 has a low resistance, usually less than 1Ω. Preferably, the track 324 has a resistance of 0.1Ω or less.

As in the prior art, the voltage drop δV across the sensing portion 304 is determined by the classic relationship:

$$\delta V = IR$$

where R is the resistance of the sensing portion, and I is the current passing through the sensing portion.

However, the location of power supplies 302a, 302b at opposite sides of the sensing portion 304 means that the only half of the voltage drop occurs compared to when a single power supply is used. Also, only half of the current is to be supplied by each power supply 302a, 302b as each power supply 302a, 302b effectively services only half of the sensing portion 204. This results in a voltage drop sensed at the serial macro 315 of one quarter as compared to when a single power supply is used. The reduced voltage drop is exemplified by line 400 in FIG. 4.

Figure 5:
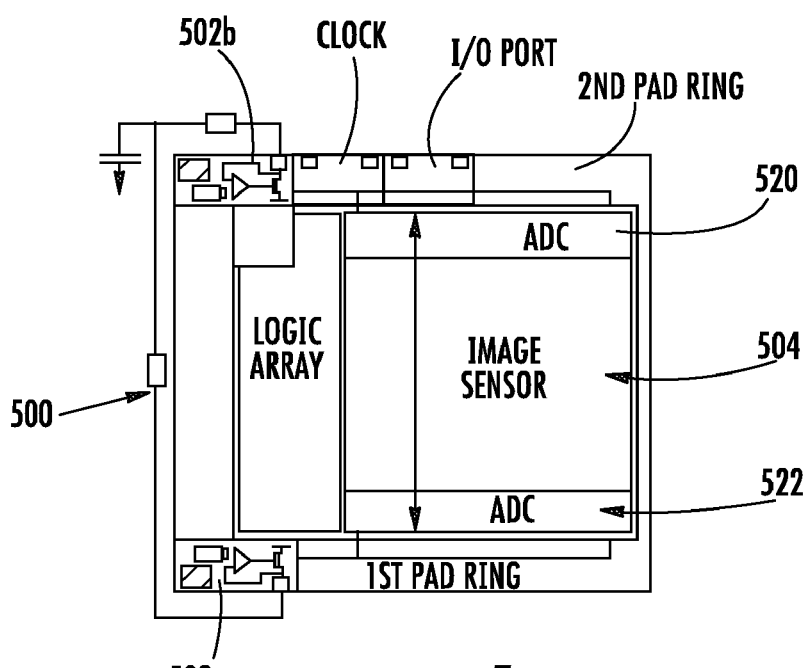
FIG. 5 is a schematic diagram of another embodiment of an image sensor power distribution arrangement according to the present invention.

Referring now to FIG. 5, a power supply arrangement 500 is substantially similar to the arrangement of FIG. 3. Accordingly, similar parts are accorded the same reference numerals in the 500 series.

The first and second power supplies 502a, 502b are connected to the sensing portion 504 at opposite ends of the respective first and second ADCs 520, 522. This has the effect of further reducing the voltage gradient across the sensing portion 504. This results in a final lower value of the voltage drop across the sensing portion 504 than the arrangement of FIG. 3.

It will be appreciated that in all the illustrated embodiments the power supplies may operate independently of each other. Each of the power supplies may comprise an independent band gap generator to regulate their respective outputs.

Referring now to FIGS. 6 and 7, an image sensor 600 comprises a lens stack 602, a sensor array 604, sealed packaging 606, a substrate 608 and a high capacitance capacitor 610. Typically, the substrate 608 is a printed circuit board.

The lens stack 602, sensor array 604 and packaging 606 are mounted upon the substrate 608, with the capacitor 610 being formed within the substrate 608. The capacitor 610 is formed of an L-shaped conductor 612 and a U-shaped conductor 610 embedded in the substrate 608. Typically, the substrate 608 will have a high dielectric constant, usually in excess of 4.

The substrate 608 acts as a dielectric between the conductors 612, 614. Respective free ends 616, 618 of the conductors 612, 614 form contact terminals 616a, 618a that can be connected to external circuitry 620. In the illustrated embodiment, the external circuitry 620 comprises an optical device power distribution arrangement as described herein with reference to either FIG. 3 or 5. It will be appreciated that the term high capacitance encompasses a capacitance greater than approximately 100 nF.

While various embodiments of the invention have been described, it will be apparent to those skilled in the art that various modifications, changes, improvements and variations may be made without departing from the scope of the invention.

That which is claimed:

1. An image sensor comprising:
   a sensing portion having a first contact at a first edge thereof, and a second contact at a second edge thereof, the second edge being different from the first edge;
   a control portion;
   a first power supply to supply power to said sensing portion via said first contact; and
   a second power supply to supply power to said sensing portion via said second contact, and to said control portion.

2. The image sensor of claim 1 wherein said control portion is adjacent the second edge of said sensing portion, with said second power supply being adjacent said control portion and said first power supply being remote from said control portion.

3. The image sensor of claim 1 further comprising a first pad ring with said first power supply located thereon; and a second pad ring with said second power supply located thereon.

4. The image sensor of claim 3 wherein said first pad ring is adjacent the first edge of said sensing portion, and said second pad ring is adjacent the second edge of said sensing portion, with said first and second pads being opposed to each other across said sensing portion.

5. The image sensor of claim 1 wherein at least one of said first and second power supplies is coupled to said sensing portion at multiple points.

6. The image sensor of claim 1 further comprising:
   a substrate with said sensing and control portions thereon, and with said first and second power supplies thereon; and
   a track on said substrate to couple together outputs of said first and second power supplies.

7. The image sensor of claim 6 wherein said track has an impedance less than 0.01Ω.

8. The image sensor of claim 1 further comprising a decoupling capacitor coupled to said second power supply.

9. The image sensor of claim 8 wherein said decoupling capacitor is external said second power supply.

10. The image sensor of claim 9 further comprising a substrate with said sensing and control portions thereon, and with said first and second power supplies thereon; and with said decoupling capacitor on said substrate.

11. The image sensor of claim 10 wherein said substrate comprises a printed circuit board.

12. An electronic optical device comprising:
a substrate;
an image sensor array on said substrate and having a first contact at a first edge thereof, and a second contact at a second edge thereof, the second edge being different from the first edge;
a controller to control said image sensor array;
at least one lens adjacent said image sensor array; and
power circuitry comprising
a first power supply to supply power to said image sensor array via said first contact, and
a second power supply to supply power to said controller, and to said image sensor array via said second contact.

13. The electronic optical device of claim 12 wherein said controller is adjacent the second edge of said image sensor array, with said second power supply being adjacent said controller and said first power supply being remote from said controller.

14. The electronic optical device of claim 12 further comprising a first pad ring with said first power supply located thereon; and a second pad ring with said second power supply located thereon.

15. The electronic optical device of claim 14 wherein said first pad ring is adjacent the first edge of said image sensor array, and said second pad ring is adjacent the second edge of said image sensor array, with said first and second pads being opposed to each other across said image sensor array.

16. The electronic optical device of claim 12 further comprising a track on said substrate to couple together outputs of said first and second power supplies.

17. The electronic optical device of claim 16 wherein said track has an impedance less than $0.01\Omega$.

18. The electronic optical device of claim 12 further comprising a decoupling capacitor coupled to said second power supply.

19. The electronic optical device of claim 12 wherein said substrate comprises a printed circuit board.

20. The electronic optical device of claim 12 wherein said substrate, said image sensor array, said controller, said at least one lens and said power distribution circuitry are configured so that at least one of the following is formed: a digital still camera, a digital video camera, a mobile telephone, a webcam, an endoscope, a bar code reader and a biosensor.

21. A method for distributing power for an image sensor comprising a sensing portion having a first contact at a first edge thereof and a second contact at a second edge thereof, the second edge being different from the first edge, and a control portion, the method comprising:
supplying power from a first power supply to the sensing portion via the first contact; and
supplying power from a second power supply to the sensing portion via the second contact, and to the control portion.

22. The method of claim 21 wherein the control portion is adjacent the second edge of the sensing portion, with the second power supply being adjacent the control portion and the first power supply being remote from the control portion.

23. The method of claim 21 wherein the image sensor further comprises a first pad ring with the first power supply located thereon; and a second pad ring with the second power supply located thereon.

24. The method of claim 23 wherein the first pad ring is adjacent the first edge of the sensing portion, and the second pad ring is adjacent the second edge of the sensing portion, with the first and second pads being opposed to each other across the sensing portion.

25. The method of claim 21 wherein the image sensor further comprises a substrate with the sensing and control portions thereon, and with the first and second power supplies thereon; and a track on the substrate for coupling together outputs of the first and second power supplies.

26. The method of claim 21 wherein the image sensor further comprises a decoupling capacitor coupled to the second power supply.

27. The method of claim 26 wherein the image sensor further comprises a substrate with the sensing and control portions thereon, and with the first and second power supplies thereon; and with the decoupling capacitor on the substrate.

* * * * *